Sept. 30, 1947.    W. G. HOWARD    2,428,115
EGG TREATING MACHINE
Filed June 28, 1944    4 Sheets-Sheet 3

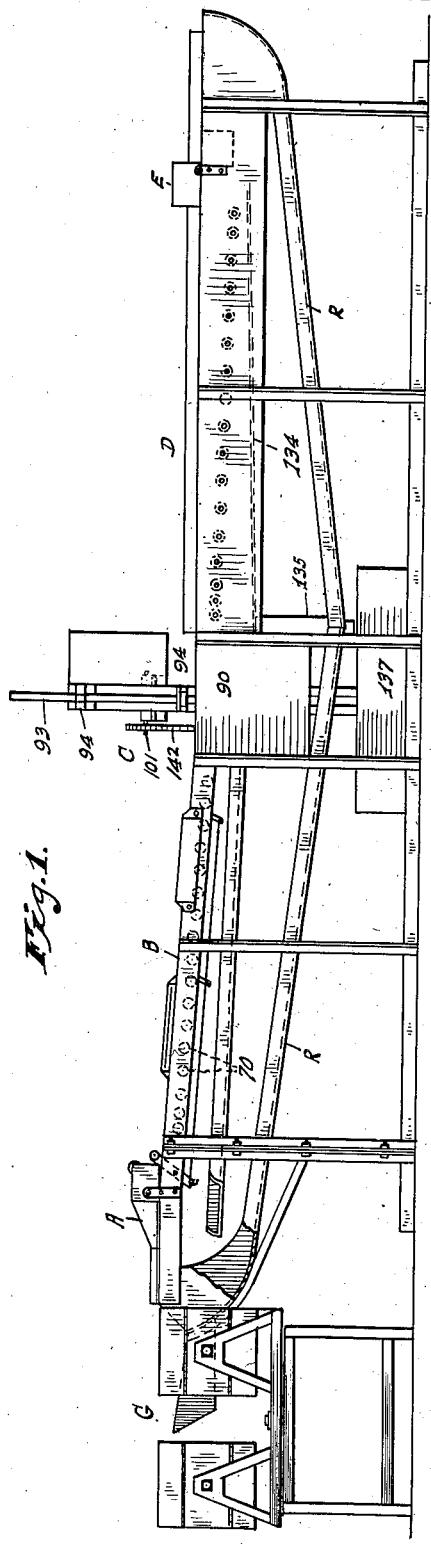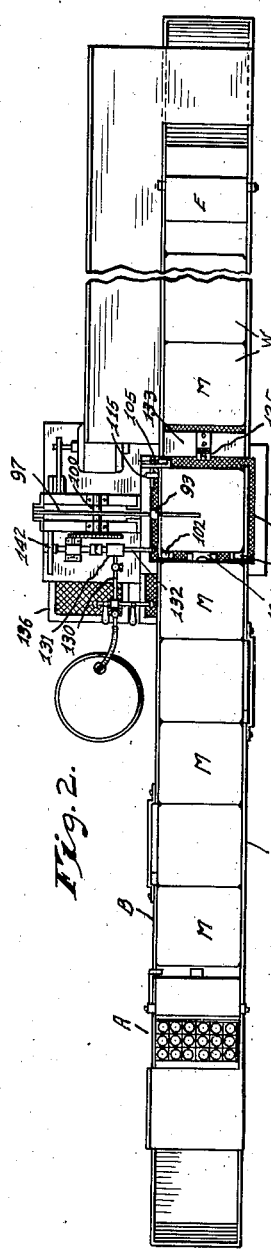

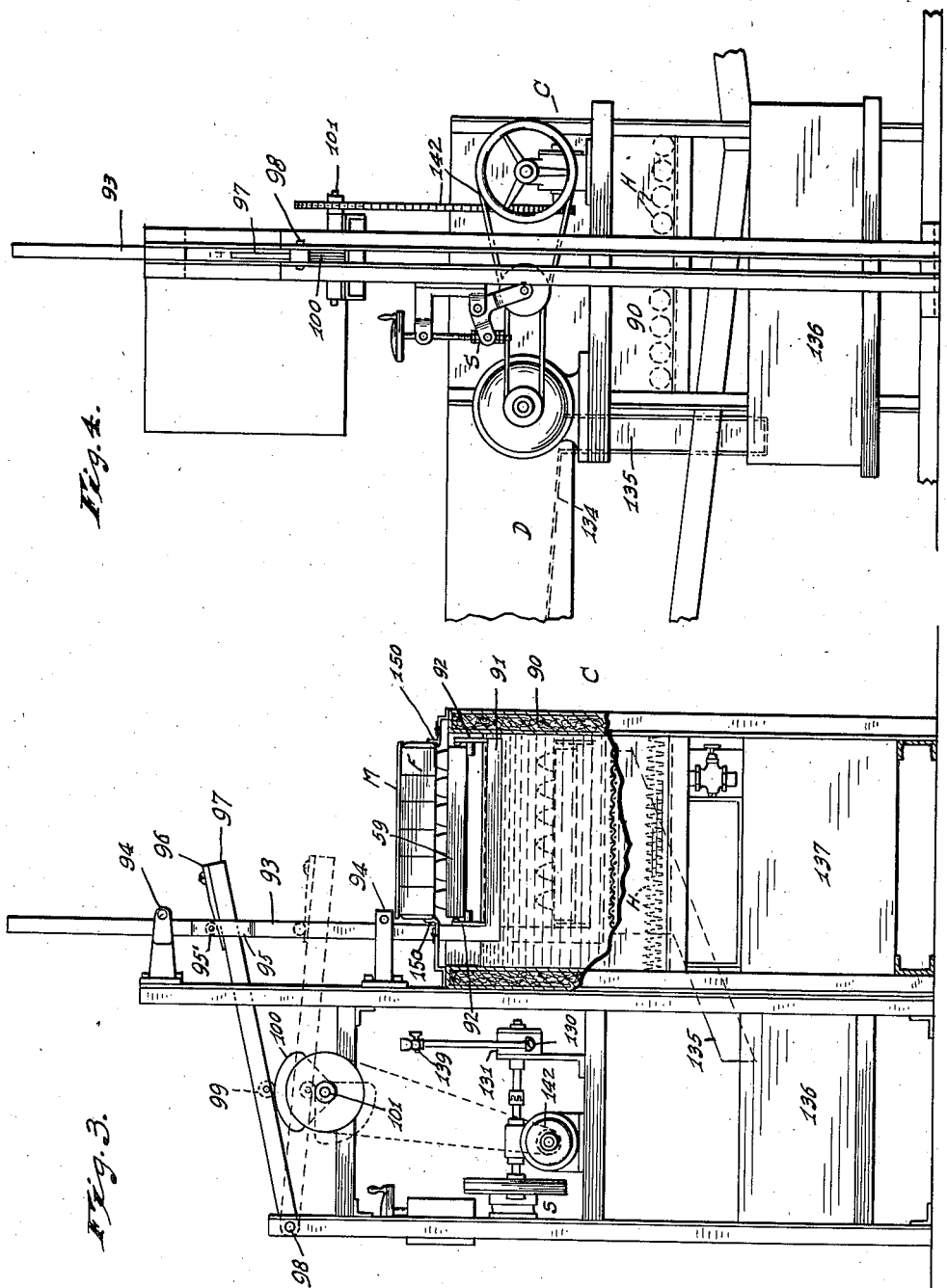

INVENTOR.
WILLIS G. HOWARD,
BY
Hood & Hahn
ATTORNEYS.

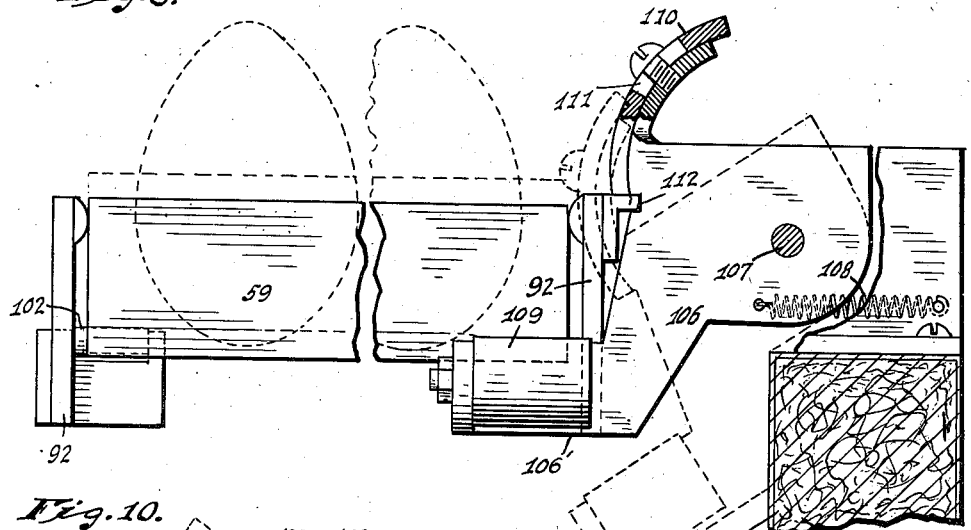
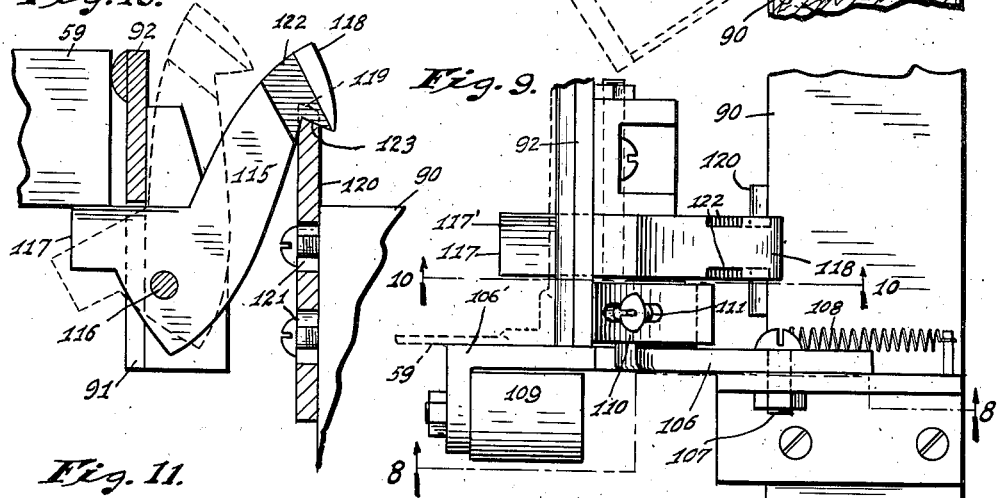
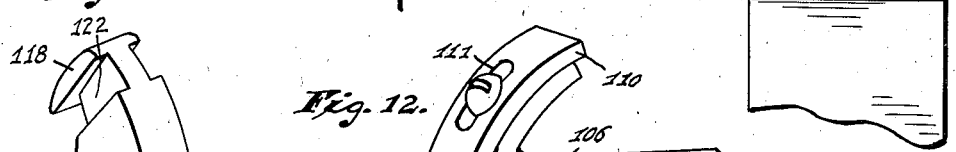
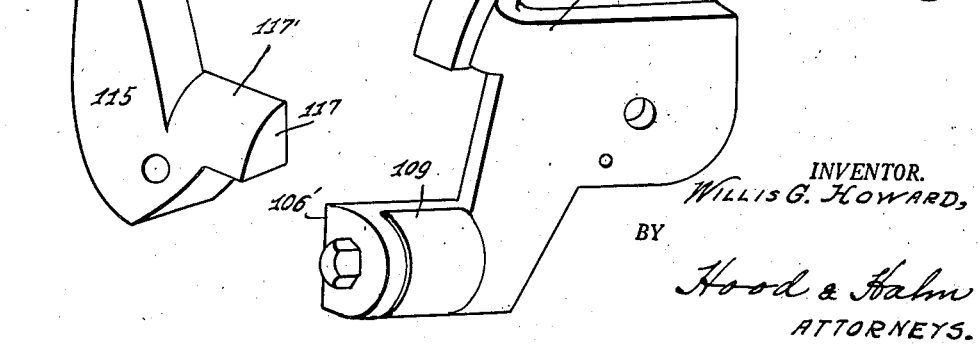

Patented Sept. 30, 1947

2,428,115

UNITED STATES PATENT OFFICE 2,428,115

EGG TREATING MACHINE

Willis G. Howard, Indianapolis, Ind.

Application June 28, 1944, Serial No. 542,587

7 Claims. (Cl. 91—46)

It has long been well known that by immersing fresh eggs, such as hen eggs, in a heated bath of suitable oil, deterioration of the eggs may be inhibited for a considerable period, and various mechanisms have been provided for accomplishing the desired treatment, such, for instance, as the mechanisms shown in my Patents 1,862,508; 1,960,339; and 1,988,795; and Patent 1,883,669 to B. E. Ford.

Eggs arrive at a treating plant packed in boxes or crates in groups of three dozen supported by a pocketed base mat and separated by a so-called "filler," a collapsible structure of two series of parallel walls or partitions, one series being positionable at right angles to the other series to form thirty-six cells, one for each of the thirty-six eggs of a group.

In mechanisms of the above-mentioned type, a plurality of cellular metal trays are provided for receiving egg groups and carrying them to, through, and from, the immersing bath, and it is necessary to transfer the egg groups from the shipping crates to such trays, to separate the fillers and base mats, to reassemble the fillers and base mats with the treated eggs and to remove the cellular trays.

The cost of handling and preservative treatment of the eggs must, of course, be included in the consumer price of the eggs and it is therefore highly important that said treatment cost shall be as low as possible.

The object of my present invention is to provide improved details of construction at, and adjacent, the immersing apparatus to insure a proper flow of egg-carrying trays, associate fillers, and mats, to and from the immersing means and flow of the egg-carrying trays from the associate fillers and mats, into the bath, back to the fillers and mats, and thence to a discharge station.

The accompanying drawings illustrate my invention.

Fig. 1 is a side elevation of apparatus embodying my invention;

Fig. 2 is a plan of the parts shown in Fig. 1;

Fig. 3 is a vertical section, on a larger scale, through the immersing bath;

Fig. 4 is a rear elevation of the parts shown in Fig. 3;

Fig. 8 is a vertical section through one of the stop mechanisms adjacent the immersion means;

Fig. 9 is a plan of the parts shown in Fig. 8;

Fig. 10 is a vertical section, on line 10—10 of Fig. 9, showing the latching means for holding the elevator in its upper position;

Fig. 11 is a perspective of the latch shown in Fig. 10;

Fig. 12 is a perspective of the stop mechanism shown in Fig. 8; and

Fig. 13 is a fragmentary vertical section showing an oil retriever.

Figure 5:
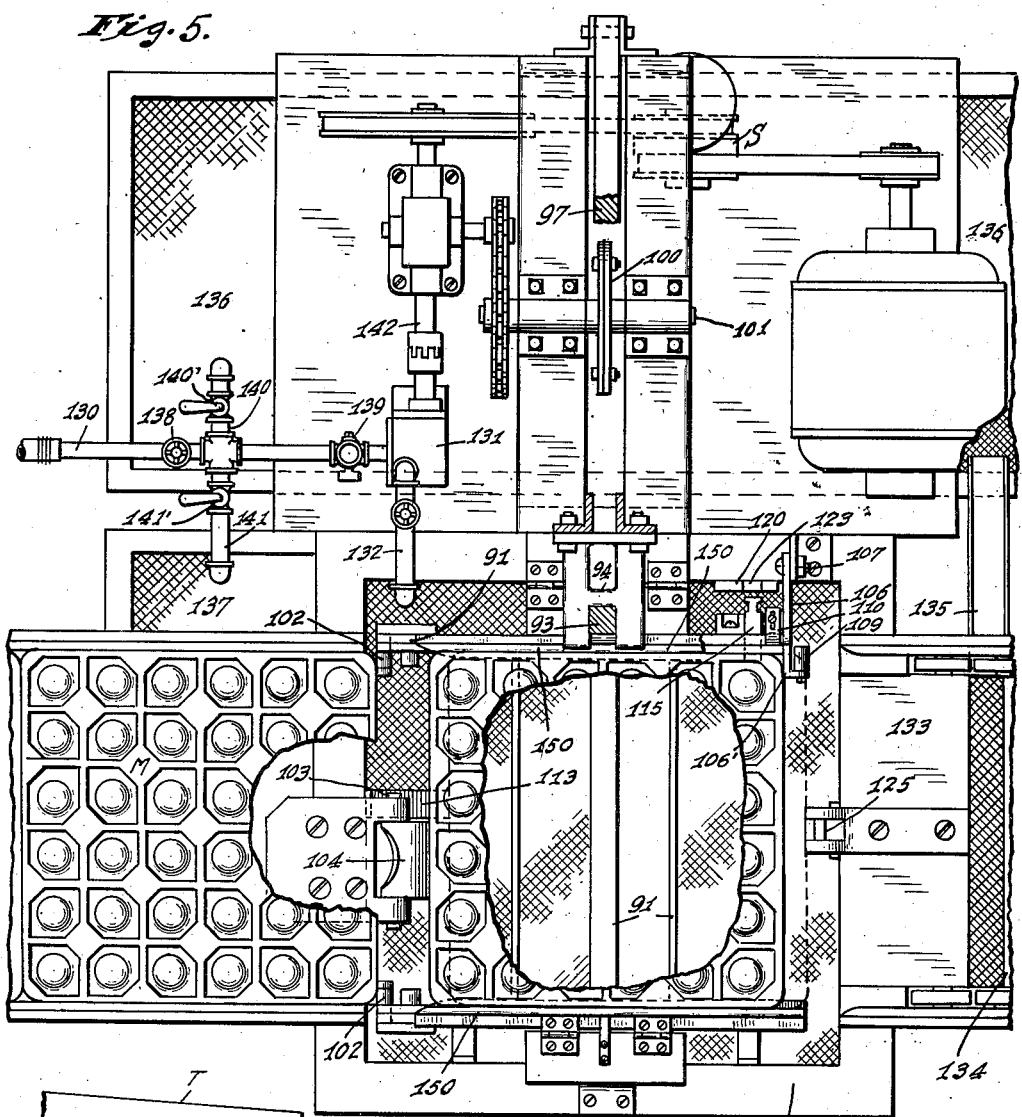
Fig. 5 is a plan, on a larger scale, of the immersion tank and adjacent parts.

In the drawings G indicates a decrating means which forms the subject matter of my copending application Serial No. 542,586, A indicates an egg-group transfer means which forms the subject matter of my copending application Serial No. 542,584, and B indicates a runway inclined downwardly to an immersion tank C from which leads a downwardly inclined runway D delivering to a tray reverting means E, all subtended by suitable drainage pans, and by a runway R leading from the delivery end of means E to a point adjacent the receiving end of means A, said parts being, in general, like similar parts in my previously mentioned patents but differing in important details.

Referring to the drawings:

The runway B comprises two parallel series of rollers 70 upon which the successive groups of egg-filled trays T and imposed fillers F and mats M ride, under the influence of gravity, until the foremost group comes into contact with stopping means, preferably controlled by the dipping means to be described.

At the immersion station C is an open topped tank 90, preferably heat insulated, into which the vertically-reciprocable carrier 91 may be projected. Carrier 91 is provided with tray guides 92 which register with the guideways B and D when the carrier is in its upper position. Carrier 91 is supported at the lower end of a plunger 93 guided for vertical reciprocation in brackets 94, 94. Plunger 93 is medially perforated by a slot 95 in the upper end of which is a roller 95' resting on an adjustable wedge 96 on lever 97 projected through slot 95 and pivoted at 98 on the main frame. A roller 99, carried by lever 97, rests upon cam 100 on shaft 101 driven through a suitable driving train, preferably including speed varying means S (Fig. 4). The adjustable wedge 96 provides ready means for insuring no more than essential upward movement of carrier 91 for registry with the runways and proper functioning of the latch mechanism to be described.

Figures 6, 7:
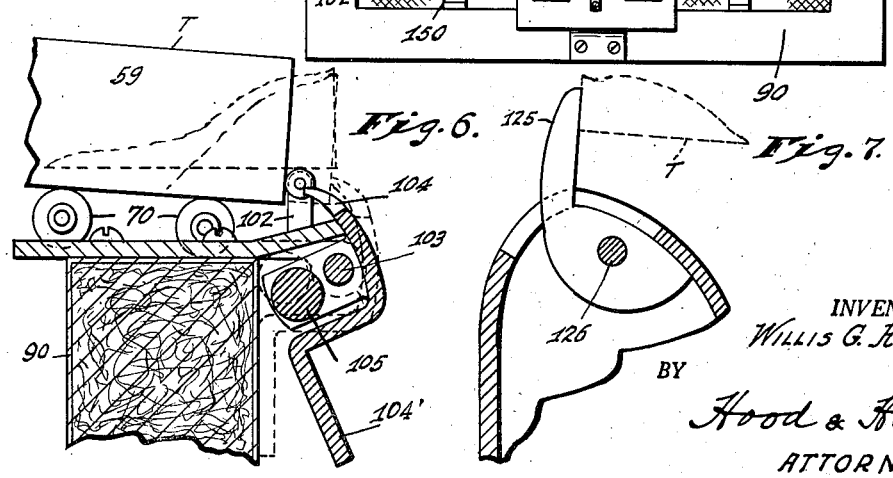
Fig. 6 is a fragmentary vertical section showing the stop mechanism at the entrance side of the bath.
Fig. 7 is a fragmentary vertical section showing the stop mechanism at the delivery side of the bath.

At the receiving side of carrier 91 I provide stop fingers 102, 102 (Figs. 5 and 6) which, when the carrier is in its upper position, obstruct forward movement of trays T, as indicated in full lines in Fig. 6.

Pivoted at 103, at the receiving side of tank 90, is the stop finger 104 counterweighted at 105, so as to normally assume the position shown in full lines in Fig. 6 in the absence of disturbing trays in runway B. The tip of finger 104 is so arranged as to be engaged by the adjacent oncoming tray T, promptly following descent of fingers 102 with carrier 91, and to be swung by such tray to the position shown in dotted lines in Fig. 6, thereby arresting forward movement of trays 59 on runway B with the forward end of the tray T overlying the paths of upward movement of fingers 102. Movement of stop finger 104 in the forward direction is limited by contact of part 104' of finger 104 with the adjacent wall of tank 90.

Upon return upward movement of carrier 91 its stop fingers 102 come up beneath the forward end of the tray T which has been arrested by finger 104 thus permitting that tray—with the accompanying filler and mat—to proceed onto the carrier 91 until it is arrested by shoulder 106' (Fig. 5) of a stop finger 106 (Figs. 8, 9, and 12) pivoted at 107 on tank 90 and normally urged to the position shown by the dotted lines in Fig. 8 by spring 108. Finger 104 is notched to avoid striking the lower ends of eggs in the tray.

The advancement of each tray onto carrier 91 is completed by descent of the rear edge of the tray over the forwardly curved surface of stop finger 104.

Finger 106, on the forward side of shoulder 106', carries a roller 109. Finger 106 also carries a finger 110, adjustable by means of the screw-and-slot fastening 111, to be engaged by a finger 112 on carrier 91 to raise finger 106 against the bias of spring 108 at the extreme of upward movement of carrier 91. Adjustment of finger 110 insures proper coaction with finger 112 to insure proper lifting of tray T by roller 109 of finger 106 to free latch 115 for proper coaction with plate 120. When carrier 91 descends into tank 90, the tray T therein engages a cam 113 which (like cam 91 in my Patent 1,960,339) serves to shove the tray T forwardly on carrier 91 for a purpose which will be made to appear. (See Fig. 5.)

In order to prevent descent of carrier 91 in the absence of a properly positioned tray T, carrier 91 is provided with a latch 115 pivoted at 116 on carrier 91 and provided with a tail 117 projected to a position where it is overridden by trays T. Latch 115 is provided with a T-shaped head 118, the projecting portion of which may overhang the upper edge 119 of a catch plate 120 attached to tank 90 by the adjustable fastening 121, and said latch is gravity biased to the solid-line position of Fig. 10. The shank of the T-head 118 is notched at 122 and the upper edge of plate 120 is notched at 123 so as to receive and coact with the notched shank of the latch, as shown in Fig. 10.

I have found that this peculiar construction of the T-head latch and notched catch plate insures a proper operation of the latch to hold carrier 91 in its upper position until released, in a manner to be described.

As a tray T approaches stop finger 106 it overrides tail 117 of latch 115 so as to retract the latch from operative position.

Heretofore, in operation of machines of this type, trouble has been experienced by accidental backward movement of trays of treated eggs on runway D and in order to avoid such trouble, I have provided the pivoted back-stop finger 125 (Figs. 5 and 7) pivoted at the delivery side of tank 90, at 126, in such manner that the trays arriving from carrier 91 may flow freely therethrough but back flow will be prevented, as clearly indicated by Fig. 7. Said finger is, of course, suitably biased toward the illustrated position.

The treating oil is delivered from a suitable source of supply through a pipe 130 and pump 131 and pipe 132 to tank 90 from whence it overflows, at a constant level, over apron 133 to a drain trough 134 (Fig. 1, dotted lines) which underlies runway D and delivers through pipe 135 (Figs. 1 and 5) to storage tank 136. A drain tank 137 underlies tank 90 to permit exhaustion and clearing of tank 90.

Pipe 130 is valved at 138 and 139 and between these two valves are pipes 140 and 141 leading, respectively, to tanks 136 and 137 and each valved at 140' and 141', respectively. Pump 131 is constantly driven by a suitable driving train 142 from the delivery side of the speed change drive S.

Carrier 91 is provided at each side with tracks or rollers to receive, support, and guide, trays arriving thereon and the tail 117 of latch 115 is upwardly and forwardly cammed at 117' (Fig. 11) so that one forward corner of each tray will successively lie thereon. The weight of the tray imposed on latch 115, so long as the weight of carrier 91 is imposed on the latch, is not sufficient to withdraw the latch from catch plate 120 but, if a loaded tray is overriding the latch at a time when the major-arc portion of cam 100 is supporting carrier 91, the imposed weight of the tray is sufficient to withdraw the latch and permit descent of carrier 91. Mounted on tank 90, above and paralleling the tray supporting guides of carrier 91, are ledges 150, 150 in position to be overridden by the fillers and imposed mats so that fillers and mats will be held in position during descent of carrier 91 with an egg loaded tray. Each ledge 150 is conveniently hinged to the tank so that it may be swung aside to facilitate withdrawal of carrier 91.

The oil in tank 90 is maintained at a constant desired temperature by a heating coil H thermostatically controlled.

The means E, at the delivery end of runway D, for reverting the groups W so that the eggs will be replaced in the fillers and the trays withdrawn, may be of the character shown in my Patent 1,988,795 of January 22, 1935.

Stop finger 104 insures a proper positioning of an oncoming tray T so that the forward end of each tray will be engaged and lifted by fingers 102 on carrier 91, so as to clear finger 104, as carrier 91 reaches its highest point. Being independent of carrier 91, finger 104 is always in position to obstruct tray flow at a definite point and may be placed medially relative to the width of the trays thereby avoiding possible canting of the trays in runway B.

During normal operation, the carrier 91 is held in its upper position during approximately one-fourth of each rotation of cam 100 so as to give ample time for discharge of a tray of treated eggs and arrival of a fresh tray. In case of non-arrival of a new tray, latch 115 will engage plate 120 and prevent descent of the carrier, so that it may receive a fresh tray while cam 100 proceeds. When the cam again engages lever 97 the carrier 91 will be raised enough to withdraw the weight of the carrier from latch 115 so that it may be retracted from latching position by the properly positioned tray T.

If, now, a new tray T arrives upon the carrier, it will ride up onto the cammed surface 117' of tail 117 of latch 115 to shift said latch to the dotted-line position of Fig. 10, whereby the carrier 91 will be permitted to descend as the major-arc portion of the cam 100 leaves the roller 99. As the carrier 91 descends, the cam 113 engages the tray to shift the same toward the right, as viewed in Fig. 5, for instance, to a position in which the forward edge of the tray overlies the roller 109, as indicated by the dotted line in Fig. 5. After submersion of the carrier for a time determined by the shape and speed of the cam 100, said carrier begins to rise again. The latch 115 is still held in inactive position by the weight of the tray T, and the finger 106 is in the dotted-line position of Fig. 8. As the carrier nears the top of its path, the finger 112 engages the finger 110 to swing the finger 106 in a clockwise direction. Such movement brings the portion 106' of the finger 106 up under the forward end of the tray T to lift such end upon the roller 109, whereby said tray is freed to move off the carrier and past the stop finger 125 onto the runway D.

Closing valves 140' and 141', opening valve 138, properly positioning valve 139, and operating pump 131, permits pump delivery of feeding oil from a suitable source to the treating tank 90.

In order to clean tank 90 it may be drained into tank 137 whereupon, by closing valve 138 and opening valve 141', the pump may act to return the oil from 137 to tank 90.

Closing of valves 141' and 138 and opening valve 140' permits pump delivery to tank 90 from tank 136.

By opening valve 139, more or less, oil delivery by the pump either from a supply source or from tanks 136 or 137 permits ingress of a regulated quantity of air which thus decreases the oil delivery by the pump so that, by this simple means, the rate of delivery of oil to the tank 90 will not greatly exceed the amount necessary to coat the eggs, no matter what may be the rate of delivery of the eggs to the treating tank.

To facilitate drainage of surplus oil from the carrying trays, I mount between guideway D and drain pan 134, a brush, pivoted on horizontal axis Y and counterweighted at Z, the bristles of said brush being of a length somewhat greater than necessary to reach the plane of the trays passing along runway D, thereby assuring contact of the brush with the trays, and consequent rapid drainage of oil from the trays, even though the brush bristles may have become considerably worn.

I claim as my invention.

1. In an egg treating machine having an immersion bath, element-supporting runways leading, respectively, to and from the bath, a vertically movable carrier alternately submergible in the bath and registrable with said runways and carrying a stop member adjacent the delivery end of the first runway, arresting means, independent of and unaffected by said carrier, in position to arrest an oncoming element on such first runway at a position short of bath registry with its leading edge above the stop member on the carrier when depressed, whereby, upon elevation of the carrier, such oncoming element will be lifted so as to clear said arresting means to move onto the carrier in registry with the bath.

2. Apparatus of the character specified in claim 1 wherein the arresting means is a pivoted counterweighted finger having a downwardly and forwardly inclined face facing the bath and carrier.

3. In an egg treating machine having an immersion bath, a vertically reciprocable egg-group carrier in registry with the bath, a lever for raising and lowering said carrier, and one-way actuating means for lifting said lever, the provision of an adjustable wedge interposed between said lever and carrier whereby maximum elevation of the carrier by the lever may be accurately determined.

4. In an egg treating machine having an immersion bath and adapted to handle a series of egg-carrying trays, a vertically reciprocable tray carrier registered with the bath, a latch movably mounted on the carrier and movable to inactive position by an imposed tray when the latch is freed of the weight of the carrier, and a catch-plate on the bath in position to receive the latch when the carrier is in its upper position and in the absence of an imposed tray, said catch-plate having a notch in its upper edge, and said latch having a T-head, the shank of which is notched and of less width than the notch in the catch-plate whereby, in coacting with the catch-plate, the shank of the latch will overlie the bottom of the notch in the catch-plate and the lateral arms of the T-head will overlie portions of the upper edge of the catch-plate flanking the notch in said plate.

5. In an egg treating machine having an immersion bath and adapted to handle a series of egg-carrying elements, runways leading, respectively, to and from the bath, and a vertically reciprocable carrier alternately movable into the bath and into register with said runways, the provision of a stop means adjacent the receiving end of the second runway preventing reverse movement of such elements from the second runway to positions overhanging the path of travel of the carrier.

6. Apparatus of the character specified in claim 5 wherein said stop means comprises a stop finger which is pivotally mounted and limited to permit flow of such elements from the bath to second runway.

7. In an egg treating machine having a bath, a vertically reciprocable carrier to receive successive elements moving through the machine, a latch carried by the carrier and movable to and from active position due to absence or presence of an element on the carrier, and a lifting finger movably mounted on the bath and movable by coaction with the carrier to lift the carrier borne element to release the latch, the provision of an adjustable element on said lifting finger and engageable by the carrier at the end of its upward movement, whereby lifting of the carrier-borne element to relieve the carrier latch may be easily and accurately predetermined.

WILLIS G. HOWARD.

REFERENCES CITED

The following references are of record in the file of this patent:

UNITED STATES PATENTS

| Number | Name | Date |
| --- | --- | --- |
| 1,520,424 | McCullough | Dec. 23, 1924 |
| 1,960,339 | Howard | May 29, 1934 |
| 1,962,722 | Krueger | June 12, 1934 |
| 1,489,944 | Kasser | Apr. 8, 1924 |
| 1,553,185 | Roussel | Sept. 8, 1925 |
| 1,814,680 | Ford | July 14, 1931 |
| 1,883,669 | Ford | Oct. 18, 1932 |